United States Patent
Horne et al.

(10) Patent No.: US 6,446,652 B1
(45) Date of Patent: Sep. 10, 2002

(54) BACKFLOW PREVENTER ASSEMBLY

(75) Inventors: Timothy P. Horne, Andover; Dale S. Tripp, N. Andover, both of MA (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 10/007,568

(22) Filed: Nov. 8, 2001

Related U.S. Application Data

(60) Division of application No. 09/461,928, filed on Dec. 15, 1999, now Pat. No. 6,325,090, which is a continuation-in-part of application No. 09/093,678, filed on Jun. 9, 1998, now Pat. No. 6,021,805.

(51) Int. Cl.$^7$ .................................................. E03C 1/10
(52) U.S. Cl. ................ 137/15.18; 137/218; 137/454.5; 137/512; 137/614.2
(58) Field of Search ........................... 137/15.18, 218, 137/454.5, 512, 614.2

(56) References Cited

U.S. PATENT DOCUMENTS

| | | | |
|---|---|---|---|
| 2,310,586 A | | 2/1943 | Lohman et al. |
| 2,710,023 A | | 6/1955 | Blackford et al. |
| 3,612,096 A | | 10/1971 | Kish et al. ............... 137/454.5 |
| 3,626,977 A | | 12/1971 | Riley et al. ............. 137/516.25 |
| 3,812,878 A | | 5/1974 | Bird et al. .................... 137/512 |
| 3,906,987 A | | 9/1975 | Rushforth et al. .......... 137/218 |
| 4,013,088 A | | 3/1977 | Gocke et al. ................ 137/116 |
| 4,159,025 A | * | 6/1979 | Harthun ....................... 137/512 |
| 4,231,387 A | | 11/1980 | Dixon .......................... 137/218 |
| 4,232,704 A | * | 11/1980 | Becker et al. ............... 137/512 |
| 4,284,097 A | | 8/1981 | Becker et al. ............... 137/218 |
| 4,333,495 A | | 6/1982 | Griswold et al. ......... 137/484.2 |
| 4,478,236 A | | 10/1984 | Neuzeret et al. ............ 137/107 |
| 4,878,515 A | | 11/1989 | Stevens ....................... 137/218 |
| 4,945,940 A | | 8/1990 | Stevens ....................... 137/218 |
| 4,991,622 A | * | 2/1991 | Brewer et al. .............. 137/512 |
| 5,046,525 A | * | 9/1991 | Powell ........................ 137/512 |
| 5,226,441 A | | 7/1993 | Dunmire et al. .............. 137/15 |
| 5,385,166 A | | 1/1995 | Dunmire et al. .............. 137/15 |
| 5,404,905 A | | 4/1995 | Laurie ......................... 137/557 |
| 5,503,176 A | | 4/1996 | Dunmire et al. .............. 137/15 |
| 5,566,704 A | | 10/1996 | Ackroyd et al. .............. 137/14 |
| 5,584,315 A | * | 12/1996 | Powell ........................ 137/512 |
| 5,746,417 A | | 5/1998 | Bowers et al. ......... 251/516.25 |
| 5,876,017 A | * | 3/1999 | Becker et al. ............... 137/375 |
| 6,220,282 B1 | * | 4/2001 | Powell ........................ 137/512 |

FOREIGN PATENT DOCUMENTS

| | | |
|---|---|---|
| DE | 44 04 194 A1 | 8/1995 |
| EP | 0 461 647 A1 | 6/1991 |
| FR | 2 709 799 A1 | 3/1995 |
| GB | 2 204 669 A | 11/1988 |
| GB | 2 227 811 A | 8/1990 |
| JP | 51 25 584 A | 5/1993 |

OTHER PUBLICATIONS

European Search Report for Application No. 99111148.5–2303–, EPO, Oct. 13, 2000. The Hague, NL.
PCT International Search Report for International Application No. PCT/US 00/33907.

* cited by examiner

Primary Examiner—Gerald A. Michalsky
(74) Attorney, Agent, or Firm—Fish & Richardson P.C.

(57) ABSTRACT

A backflow preventer assembly includes a housing having a first end and a second end, a first mounting assembly configured to removably secure a first check valve at a region of first end of the housing, and a second mounting assembly configured to removably secure a second check valve at a region of the second end of the housing. The housing includes a wall having an inner surface defining a through bore extending between the first and second ends. Each mounting assembly has a wall with an inner surface defining a through bore in fluid communication with the housing through bore. A first coupling secures the first mounting assembly to the housing, and a second coupling secures the second mounting assembly to the housing.

17 Claims, 6 Drawing Sheets

BACKFLOW PREVENTER ASSEMBLY

CROSS-REFERENCE TO RELATED APPLICATIONS

This application is a divisional of U.S. application Ser. No. 09/461,928, filed Dec. 15, 1999, now U.S. Pat. No. 6,325,090, which is a continuation-in part of U.S. application Ser. No. 09/093,678, filed on Jun. 9, 1998 (now U.S. Pat. No. 6,021,805, entitled "Backflow Preventer Assembly." The content of all of these applications is hereby incorporated by reference.

BACKGROUND OF THE INVENTION

This invention relates to a backflow preventer.

Backflow preventers are principally used for preventing contamination of a public water distribution system by preventing backflow or back-siphonage of contaminated water into the system. Usually, the backflow preventer assembly is installed in a pipeline between a main supply line and a service line that feeds an installation, e.g., hotels, factories or other institutions, or even a multi or single family residence. A backflow preventer assembly typically includes two check valves permitting flow only in the direction from the main supply line to the service line.

SUMMARY OF THE INVENTION

In one aspect, the invention features a backflow preventer assembly including a housing having a first end and a second end, a first mounting assembly configured to removably secure a first check valve adjacent the first end of the housing, and a second mounting assembly configured to removably secure a second check valve adjacent the second end of the housing. The housing includes a wall having an inner surface defining a through bore extending between the first end and the second end. Each mounting assembly has a wall with an inner surface defining a through bore in fluid communication with the housing through bore. A first coupling secures the first mounting assembly to the housing, and a second coupling secures the second mounting assembly to the housing.

Embodiments of this aspect of the invention may include one or more of the following features.

The first and second couplings are solder joints, weld joints, or clamps. Alternatively, the first coupling includes threads on the inner surface of the housing wall adjacent the first end of the housing and threads on an outer surface of the first mounting assembly, and the second coupling includes threads on the inner surface of the housing wall adjacent the second end of the housing and threads on an outer surface of the second mounting assembly.

In another illustrated embodiment, the first coupling includes a flange on the first mounting assembly and a flange at the first end of the housing for coupling to the first mounting assembly flange, and the second coupling includes a flange on the second mounting assembly and a flange at the second end of the housing for coupling to the second mounting assembly flange. Alternatively, the first coupling includes a circumferential groove on the first mounting assembly and a circumferential ridge at the first end of the housing wall, and the second coupling includes a circumferential groove on the second mounting assembly and a circumferential ridge at the second end of the housing wall.

The backflow preventer assembly further includes plating material located on the inner surface of the housing and the inner surface of the first mounting assembly. The plating material is a metal coating, e.g., nickel, or a polymer coating, e.g., polyurethane.

The backflow preventer assembly further includes a first ball valve assembly attached to the first mounting assembly and a second ball valve assembly attached to the second mounting assembly. The first mounting assembly and the second mounting assembly each includes an inner end and an outer end. The outer ends of the first mounting assembly and the second mounting assembly are threaded, and the first ball valve assembly is threadedly attached to the outer end of the first mounting assembly and the second ball valve assembly is threadedly attached to the outer end of the second mounting assembly.

An outer surface of the housing wall, an outer surface of the first mounting assembly wall, an outer surface of the first ball valve assembly, an outer surface of the second mounting assembly wall, and an outer surface of the second ball valve assembly include plating material. An inner surface of the first ball valve assembly and an inner surface of the second ball valve assembly include plating material.

The backflow preventer assembly further includes a first check valve assembly attached to the first mounting assembly and a second check valve assembly attached to the second mounting assembly. The first mounting assembly and the second mounting assembly each includes an inner end and an outer end. The inner ends of the first mounting assembly and the second mounting assembly are threaded, and the first check valve assembly is threadedly attached to the inner end of the first mounting assembly and the second check valve assembly is threadedly attached to the inner end of the second mounting assembly.

The housing wall defines an access port, and a cover closes the access port. The backflow preventer assembly includes a plurality of test cocks.

A pressure reduction assembly is in fluid communication with the housing through bore, and a connection assembly secured to the housing wall attaches the pressure reduction assembly to the backflow preventer. The connection assembly includes a union nut. The housing wall includes an outward extension for attachment of the pressure reduction assembly thereto. The outward extension defines a through bore.

In another aspect, the invention features a backflow preventer assembly including a housing having a first end and a second end, a wall having an inner surface defining a through bore extending between the first end and the second end, and a connection assembly. The housing wall includes an outward extension defining a through bore in fluid communication with the housing through bore, and the connection assembly is secured to the outward extension for attachment of a pressure reduction assembly thereto. The connection assembly includes a union nut and a cylindrical tube. The cylindrical tube has a first end axially inserted into the through bore of the outward extension and a second end with a rim configured to retain the union nut.

In another aspect, the invention features a method of mounting ball valves and check valves to a backflow preventer. The method includes securing opposed surfaces of a first mounting assembly and a housing with securing material, and securing opposed surfaces of a second mounting assembly and the housing.

Embodiments of this aspect of the invention may include one or more of the following features.

An inner surface of the housing, an inner surface of the first mounting assembly, and an inner surface of the second mounting assembly are plated with plating material. The plating material forms a wall restricting migration of the securing material into a bore of the housing, a bore of the first mounting assembly, and a bore of the second mounting assembly.

The method further includes threadedly attaching ball valve assemblies to the outer ends of the first and second mounting assemblies, and threadedly attaching check valve assemblies to the inner ends of the first and second mounting assemblies.

In another aspect, the invention features a method of mounting valves to a backflow preventer including securing opposed surfaces of a first mounting assembly and a first end of a housing, securing opposed surfaces of a second mounting assembly and a second end of the housing, removably attaching a first check valve assembly to an inner end of the first mounting assembly, and removably attaching a second check valve assembly to an inner end of the second mounting assembly.

Embodiments of this aspect of the invention may include one or more of the following features.

The method further includes removably attaching first and second ball valve assemblies to the outer ends of the mounting assemblies. The opposed surfaces of the mounting assemblies and the housing are secured together with securing material. The mounting assemblies and the housing are threaded, bolted, clamped, or crimped together. The check valve assemblies are threadedly attached to the mounting assemblies, and the ball valve assemblies are threadedly attached to the mounting assemblies.

The method further includes plating an inner surface of the housing, an inner surface of the first mounting assembly, and an inner surface of the second mounting assembly with plating material.

Advantages of the invention include a backflow preventer assembly that is less expensive to manufacture than currently available backflow preventer assemblies for similar applications, and permits easy service and replacement of the check valves and ball valves.

Other features and advantages of the invention will become apparent from the following detailed description and from the claims.

DESCRIPTION OF THE PREFERRED EMBODIMENTS

Figure 1:
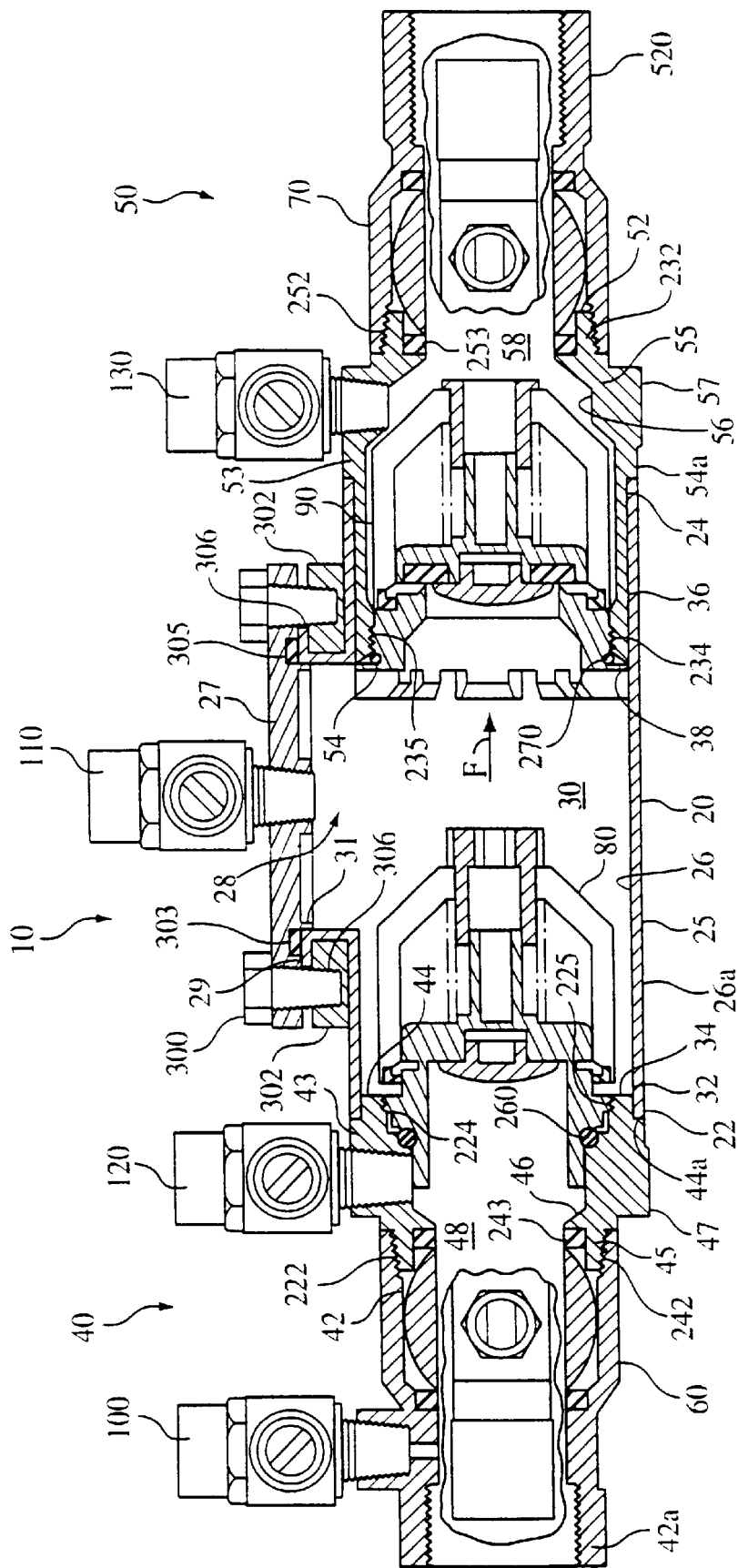
FIG. 1 is a somewhat diagrammatic cross-sectional view of a backflow preventer assembly according to the invention.

Referring to FIG. 1, a backflow preventer assembly 10 includes a housing 20 having a first end 22, a second end 24, and a wall 25. A through bore 30 extends between ends 22, 24 of housing 20 for flow of water therethrough. A pair of valve modules 40, 50 are located in the regions of ends 22, 24, respectively, of housing 20.

Valve module 40 includes a mount 43, a ball valve assembly 60, e.g., Ball Valve Assembly Part No. FBV-E-775 available from Watts Industries, North Andover, Mass., and a check valve assembly 80, e.g., Check Valve Assembly Part No. SA-775CA37 also available from Watts Industries. A through bore 48 defined by mount 43 and ball valve assembly 60 is in fluid communication with housing bore 30 when check valve assembly 80 is in an open, flow position. Mount 43 has an outer end 42, an inner end 44, and a wall 45 having an outer surface 47 and an inner surface 46. Inner end 44 of mount 43 steps down in outer diameter at a shoulder 44a to define a contact surface 32. To secure mount 43 to housing 20, inner end 44 of mount 43 is inserted into first end 22 of housing 20, with contact surface 32 abutting an inner surface 26 of housing 20. Securing material 34, e.g., solder or hard solder (brazing), is used to connect contact surface 32 to inner surface 26 of wall 25. Alternatively, contact surface 32 and inner surface 26 are welded together.

Outer end 42 of mount 43 defines external threads 222. Ball valve assembly 60 defines cooperating internal threads 242 for connecting ball valve assembly 60 to mount 43. An o-ring 243 is located between mount 43 and ball valve assembly 60 to prevent fluid leakage therebetween. Inner end 44 of mount 43 defines internal threads 224. Check valve assembly 80 defines cooperating external threads 225 for connecting check valve assembly 80 to mount 43. An o-ring 260 is located between mount 43 and check valve assembly 80 to prevent fluid leakage therebetween.

Valve module 50 includes a mount 53, a ball valve assembly 70, e.g., Ball Valve Assembly Part No. FBV-775 also available from Watts Industries, and a check valve assembly 90, e.g., Check Valve Assembly Part No. SA-775CB37 also available from Watts Industries. A through bore 58 defined by mount 53 and ball valve assembly 70 is in fluid communication with bore 30 when check valve assembly 90 is in an open, flow position. Mount 53 has an outer end 52, an inner end 54, and a wall 55 having an outer surface 57 and an inner surface 56. Inner end 54 of mount 53 steps down in diameter at a shoulder 54a to define a contact surface 36. To secure mount 53 to housing 20, inner end 54 of mount 53 is inserted into first end 22 of housing 20, with contact surface 36 abutting inner surface 26 of housing 20. Securing material 38, e.g., solder or hard solder (brazing), is used to connect contact surface 36 to inner surface 26 of wall 25. Alternatively, contact surface 36 and inner surface 26 are welded together.

Outer end 52 of mount 53 defines external threads 232. Ball valve assembly 70 defines cooperating internal threads 252 for connecting ball valve assembly 70 to mount 43. An o-ring 253 is located between mount 43 and ball valve assembly 70 to prevent fluid leakage therebetween. Inner end 54 of mount 53 defines internal threads 234. Check valve assembly 90 defines cooperating external threads 235 for connecting check valve assembly 90 to mount 43. An o-ring 270 is located between mount 43 and check valve assembly 90 to prevent fluid leakage therebetween.

Housing 20 defines a port 28 which provides access to bore 30 and check valve assemblies 80, 90. A lip 29 of housing 20 defines a region 301 (FIG. 2) for retaining fastening nuts 302 having an inner threaded bore 306. Port 28 is closed by securing a cover 27 to housing 20 with threaded fastening screws 300 which are received by nuts 302. A circumferential rim 31 of cover 27 defines a groove 303 in cover 27 in which an o-ring 305, e.g., made from Viton, is located to create a fluid-tight seal between cover 27 and lip 29.

Figure 2:
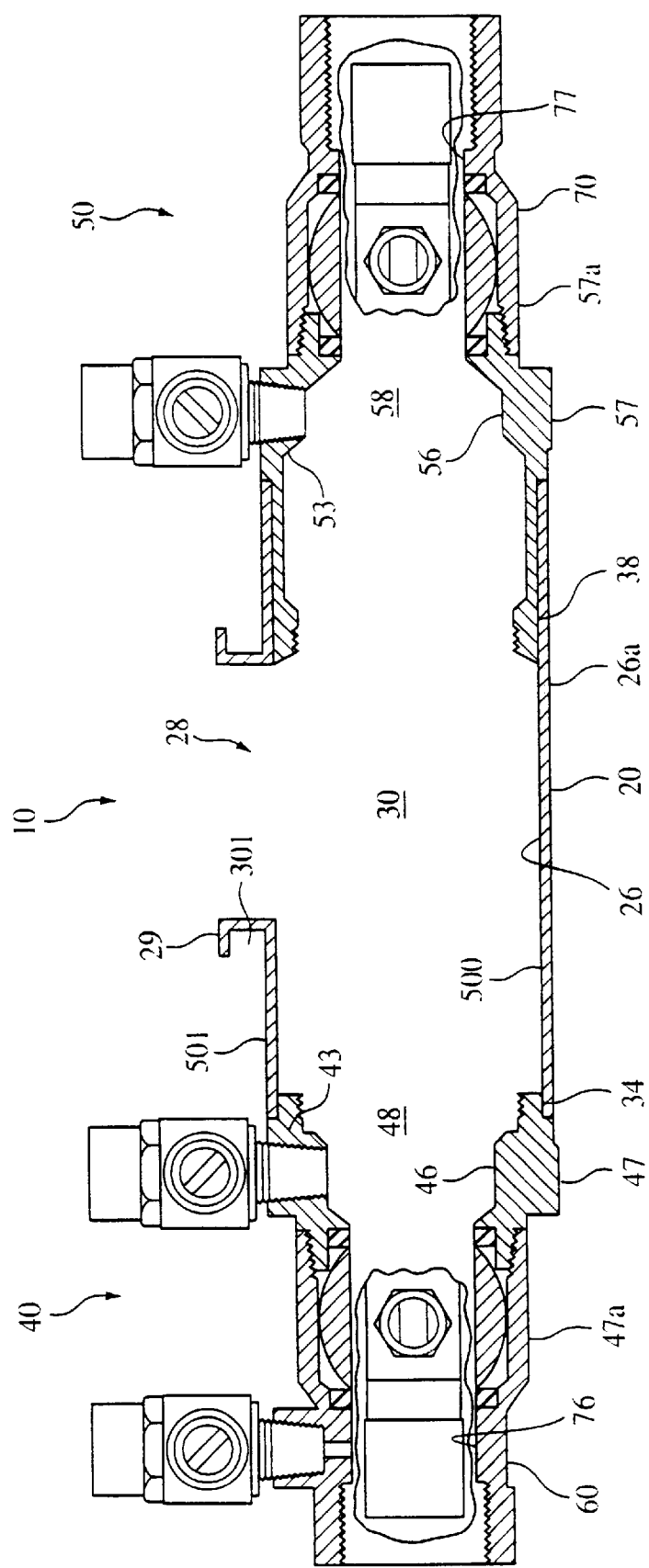
FIG. 2 is a somewhat diagrammatic cross-sectional view of the backflow preventer assembly of FIG. 1 shown with check valves and a cover removed.

Referring to FIG. 2, an assembly of mounts 43, 53, housing 20, and ball valve assemblies 60, 80 is plated. Inner surface 26 of housing 20, inner surface 46 of mount 43, inner surface 56 of mount 53, inner surface 76 of ball valve assembly 60, and inner 77 of ball valve assembly 80 are plated with, e.g., nickel or chrome, to form an inner wall 500. Ball valve assemblies 60, 80 are held in their open positions during the plating process, e.g., electroless nickel plating. Wall 500 acts to seal and restrict migration of securing material 34, 38 into bores 30, 48, and 58.

Plating material is also applied to an outer surface 26a of housing 20, to outer surfaces 47, 57 of mounts 43, 53, respectively, and to outer surfaces 47a, 57a of ball valve assemblies 60, 70, respectively, to form an outer wall 501. Wall 501 acts to seal and restrict migration of securing material 34, 38. Walls 500, 501 also function to minimize oxidation of backflow preventer assembly 10 and to assist in sealing small leaks. In general, the plating material can be made from materials that are corrosion resistant, e.g., metal coatings and polymer coatings. Examples of metal and polymer coatings include, but are not limited to, nickel, chrome, teflon, epoxy, and polyurethane.

Figure 3A:
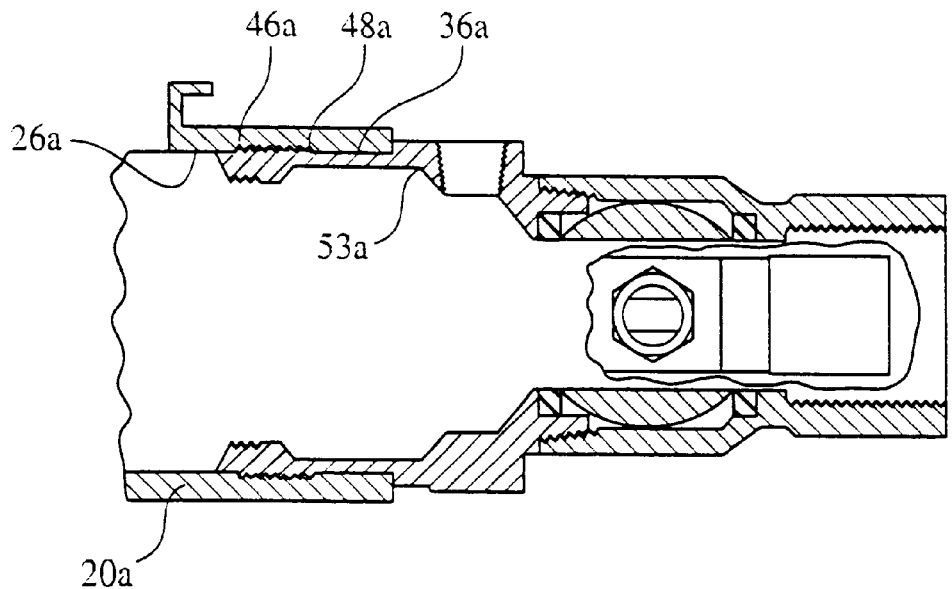
FIGS. 3A–3D are somewhat diagrammatic partial cross-sectional views of the backflow preventer assembly of FIG. 2 with alternative methods for securing valve mounts to the assembly housing.
Figure 3B:
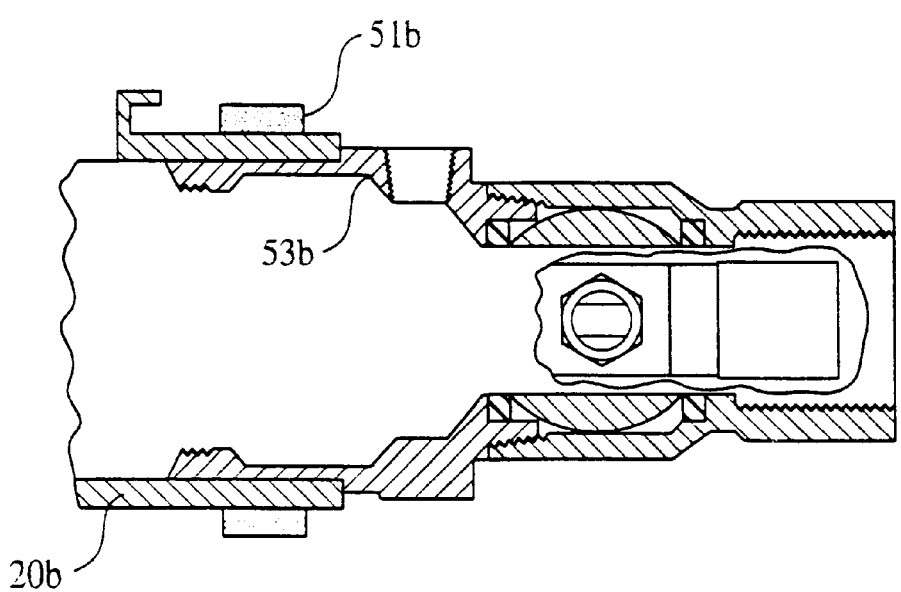
Figure 3C:
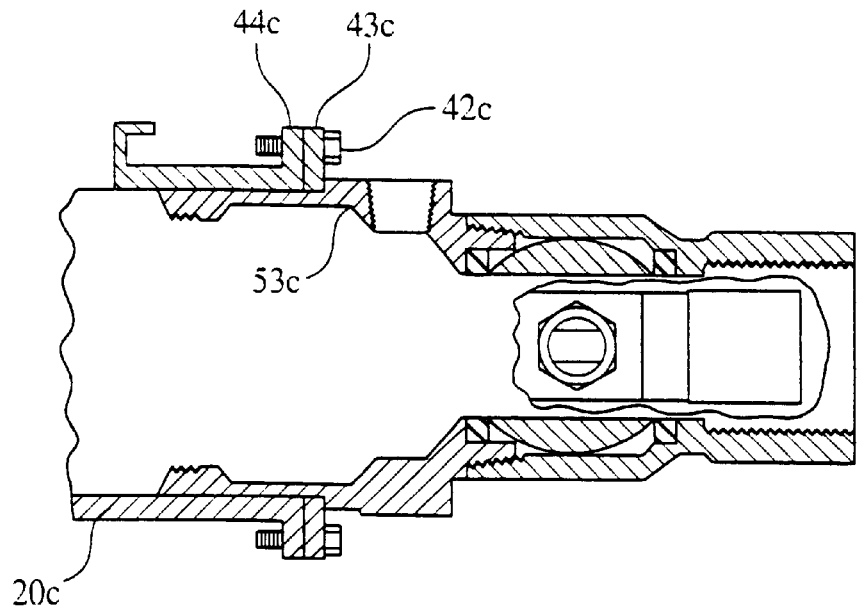
Figure 3D:
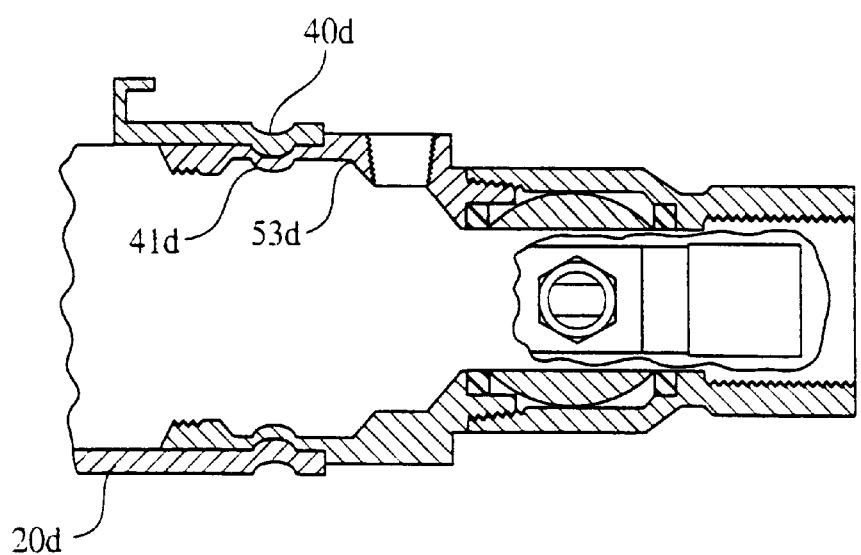

Valve mounts 43, 53 can also be secured to the housing by methods other than soldering and welding. For example, referring to FIG. 3A, a valve mount 53a includes threads 48a on an outer surface 36a of the mount for engaging threads 46a on an inner surface 26a of housing 20a. Referring to FIGS. 3B–3D, in other embodiments, a mount 53b is secured to a housing 20b with a clamp 51b (FIG. 3B); a mount 53c is attached to a housing 20c by securing a flange 43c of mount 53c to a flange 44c of housing 20c, e.g., with bolts 42c, (FIG. 3C); and a mount 53d is secured to housing 20d by crimping housing 20d to create circumferential grooves 40d, 41d in housing 20d and mount 53d, respectively (FIG. 3D).

Referring again to FIG. 1, check valve assemblies 80, 90 can be accessed for service and replacement through port 28. To remove a non-functioning check valve assembly, cover 27 is unscrewed from housing 20 and the check valve assembly is disengaged from its respective mount (43 or 53). A new or rebuilt check valve assembly is then inserted into back flow preventer assembly 10 through port 28 and engaged with the respective mount.

Check valve assemblies 80, 90 are oriented in sequence to allow flow of water through bore 30 in a first direction, indicated by arrow, F (FIG. 1), but to prevent back flow of water in the opposite direction. Check valve modules 80, 90 are biased in the opposite direction of arrow, F, to exceed a predetermined threshold before the check valves are opened.

In use, potable water from the public water distribution system enters the backflow preventer assembly 10 at an end 42a of ball valve assembly 60. Assuming that ball valve assemblies 60, 70 are open and that the supply pressure exceeds the predetermined threshold value biasing the check valve assemblies 80, 90 towards closed positions, the check valve assemblies open to allow water flow in through first end 42a of ball valve assembly 60, through bores 48, 30 and 58, and finally through an end 52a of ball valve assembly 70. In the closed position, ball valve assemblies 60, 70 are used to isolate backflow preventer assembly 10 from external water flow for either servicing check valve assemblies 80, 90, as described above, or testing water quality and pressure through a series of test ports 100, 110, 120, 130.

Figure 4:
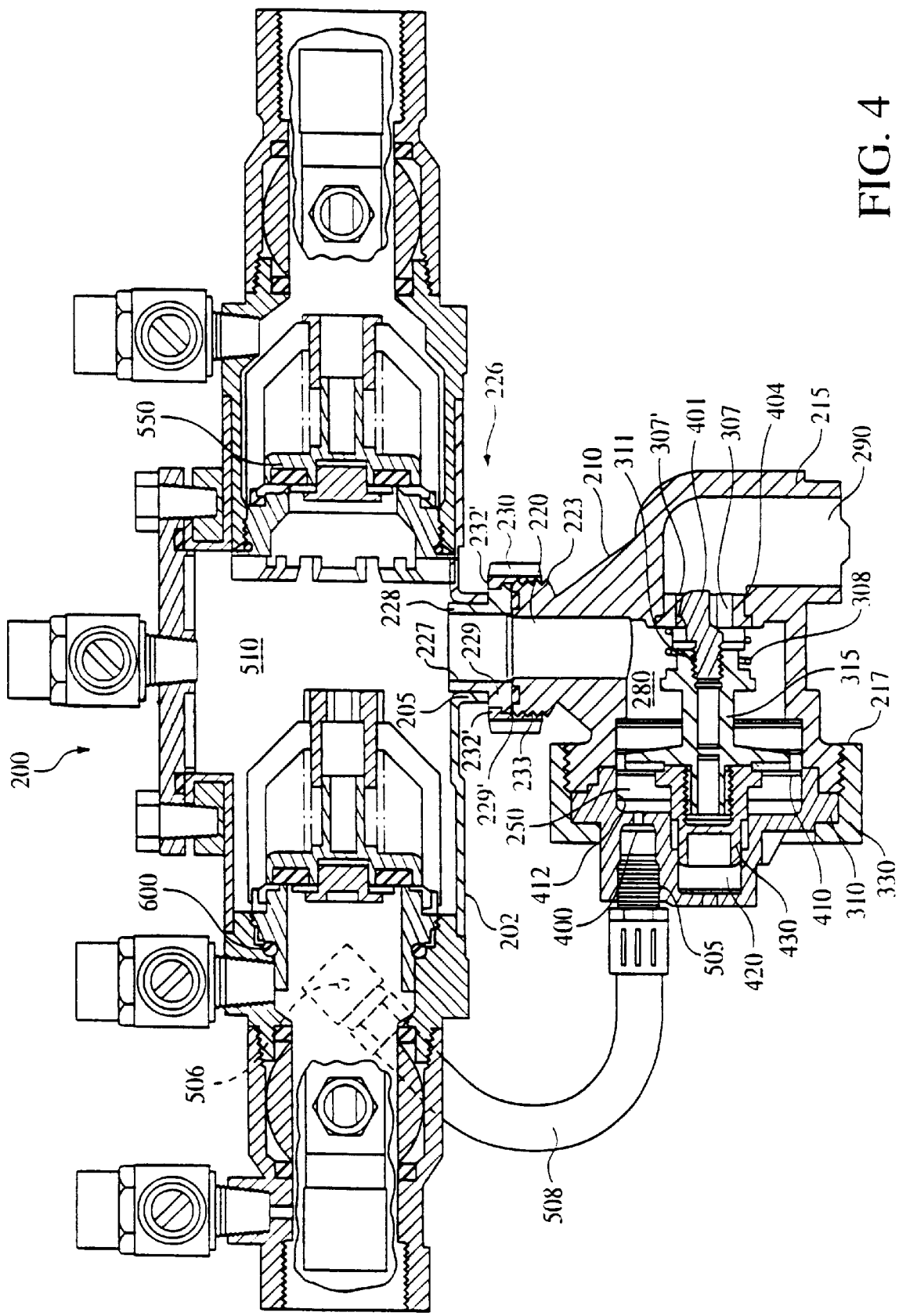
FIG. 4 is a somewhat diagrammatic cross-sectional view of a reduced pressure backflow preventer assembly.
Figure 5:
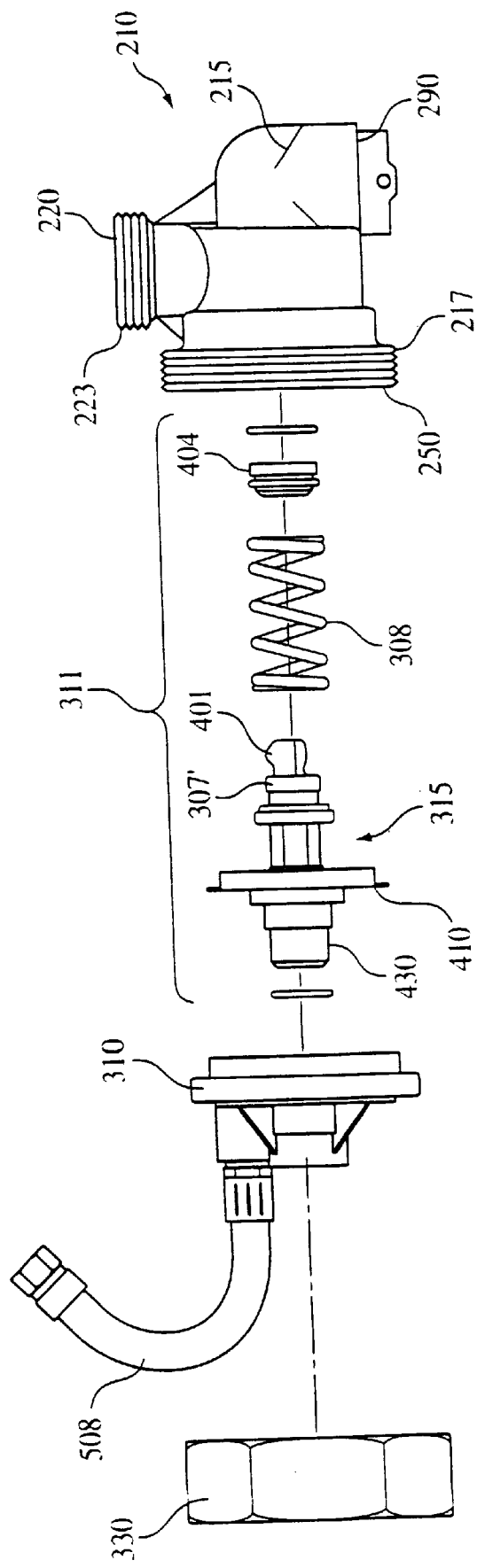
FIG. 5 is an exploded side view of the pressure reduction assembly of FIG. 4.

In an alternative embodiment shown in FIGS. 4 and 5, a reduced pressure backflow preventer assembly 200 includes a pressure reduction assembly 210 for relieving excess pressure. Backflow preventer assembly 200 includes a housing 202 having a tubular extension 205 and a connection assembly 226 mounted to tubular extension 205 for attaching pressure reduction assembly 210 to housing 202.

Connection assembly 226 includes a tube 228 attached into tubular extension 205 and an union nut 230 having threads 233 for engaging pressure reduction assembly 210. Tube 228 has a flared edge 229' at end 229, and union nut 230 has an inwardly flared edge 232' configured to engage tube edge 229'. To assemble connection assembly 226 to housing 202, union nut 230 is first slid over end 227 of tube 228, and then tube 228 is joined, such as by solder, weld, crimp, clamp, flange, or threads, to tubular extension 205. The abutment of edge 232' against edge 229' retains union nut 230 on tube 228.

Pressure reduction assembly 210 includes a body 215, a cover 310 attached to body 215, e.g., by a circumferential nut 330, and a hose 508. Body 215 defines an inlet bore 220, an inlet bore 250, and an outlet bore 290. Hose 508 has an inlet end 506 located at the upstream side of valve module 600 and an outlet end 505 threadedly attached to cover 310 and in fluid communication with inlet 250. Cover 310 defines a passage 400 for flow of fluid from hose 508 to inlet 250.

Body 215 includes threads 217 at inlet 250 and threads 223 at inlet 220, as best seen in FIG. 5. Threads 223 at inlet 220 engage with union nut 230 of connecting assembly 226 to secure pressure reduction assembly 210 to housing 202, and threads 217 at inlet 250 engage circumferential nut 330 to secure cover 310 to body 215.

Body 215 defines a central through bore 280. Removably mounted within through bore 280 is a relief valve 311. Relief valve 311 includes a valve element 315 movable between an open position (as shown in FIG. 4) permitting fluid flow from hose 508 to inlet 250, and a closed position in which passage 400 is blocked to limit flow from hose 508 to inlet 250. Relief valve 311 includes a spring 308 which biases valve element 315 toward the closed position. Valve element 315 has a seal 410 which engages a face 412 of cover 310 to block passage 400 when in the closed position.

Relief valve 311 includes an end seal assembly 404 located in outlet 290. Assembly 404 defines a through bore 308 and valve element 315 has a stem 401 located within through bore 307 having a sealing surface 307' for blocking outlet 290 when valve element 315 is in the open position. When valve element 315 is in the closed position, sealing surface 307' is removed from through bore 307 allowing fluid communication between inlet 220 and outlet 290. Cover 310 has recess 420 and valve element 315 has an extension 430 located within recess 420 for guiding valve element 315 during movement of valve element 315 between the open and closed positions.

During normal operation, fluid at inlet 506 travels through hose 508 to inlet 250. The fluid pressure causes valve element 315 to move toward its open position, blocking outlet 290. When the fluid pressure at inlet 506 drops below a predetermined value, spring 308 moves valve element 315 toward the closed position. This permits any fluid located downstream of valve module 600, e.g., in a central bore 510 of housing 202, to exit 200 by traveling through inlet 220 and out of pressure reduction assembly 210 via outlet 290. Thus, if valve 550 fails, any backflow of fluid exits backflow preventer assembly 200 through pressure reduction assembly 210.

Other embodiments are within the scope of the following claims.

What is claimed is:

1. A method of mounting valves to a backflow preventer, comprising:

securing opposed surfaces of a first mounting assembly and a first end of a housing, the first mounting assembly having an inner end and an outer end, securing opposed surfaces of a second mounting assembly and a second end of the housing, the second mounting assembly having an inner end and an outer end, removably attaching a first check valve assembly to the inner end of the first mounting assembly, and removably attaching a second check valve assembly to the inner end of the second mounting assembly.

2. The method of claim 1 further comprising:

removably attaching a first ball valve assembly to the outer end of the first mounting assembly, and removably attaching a second ball valve assembly to the outer end of the second mounting assembly.

3. The method of claim 2 wherein the first ball valve assembly is threadedly attached to the first mounting assembly.

4. The method of claim 2 wherein the second ball valve assembly is threadedly attached to the second mounting assembly.

5. The method of claim 1 wherein the opposed surfaces of the mounting assemblies and the housing are secured together with securing material.

6. The method of claim 1 wherein the mounting assemblies and the housing are threaded together.

7. The method of claim 6 further comprising plating an inner surface of the housing, an inner surface of the first mounting assembly, and an inner surface of the second mounting assembly with plating material, the plating material forming a wall restricting migration of the securing material into a bore of the housing, a bore of the first mounting assembly, and a bore of the second mounting assembly.

8. The method of claim 6 further comprising threadedly attaching a ball valve assembly to the outer end of the first mounting assembly.

9. The method of claim 6 further comprising threadedly attaching a ball valve assembly to the outer end of the second mounting assembly.

10. The method of claim 6 further comprising threadedly attaching a check valve assembly to the inner end of the first mounting assembly.

11. The method of claim 6 further comprising threadedly attaching a check valve assembly to the inner end of the second mounting assembly.

12. The method of claim 1 wherein the mounting assemblies and the housing are bolted together.

13. The method of claim 1 wherein the mounting assemblies and the housing are clamped together.

14. The method of claim 1 wherein the mounting assemblies and the housing are crimped together.

15. The method of claim 1 wherein the first check valve assembly is threadedly attached to the first mounting assembly.

16. The method of claim 1 wherein the second check valve assembly is threadedly attached to the second mounting assembly.

17. The method of claim 1 further comprising plating an inner surface of the housing, an inner surface of the first mounting assembly, and an inner surface of the second mounting assembly with plating material.

* * * * *